Sept. 27, 1932.  F. O. SNOW, JR  1,879,569
CLUTCH
Filed Aug. 16, 1928   2 Sheets-Sheet 1

Inventor:
Frederick O. Snow, Jr.
by Emery, Booth, Janney & Warner
Attys.

Sept. 27, 1932.   F. O. SNOW, JR   1,879,569
CLUTCH
Filed Aug. 16, 1928   2 Sheets-Sheet 2
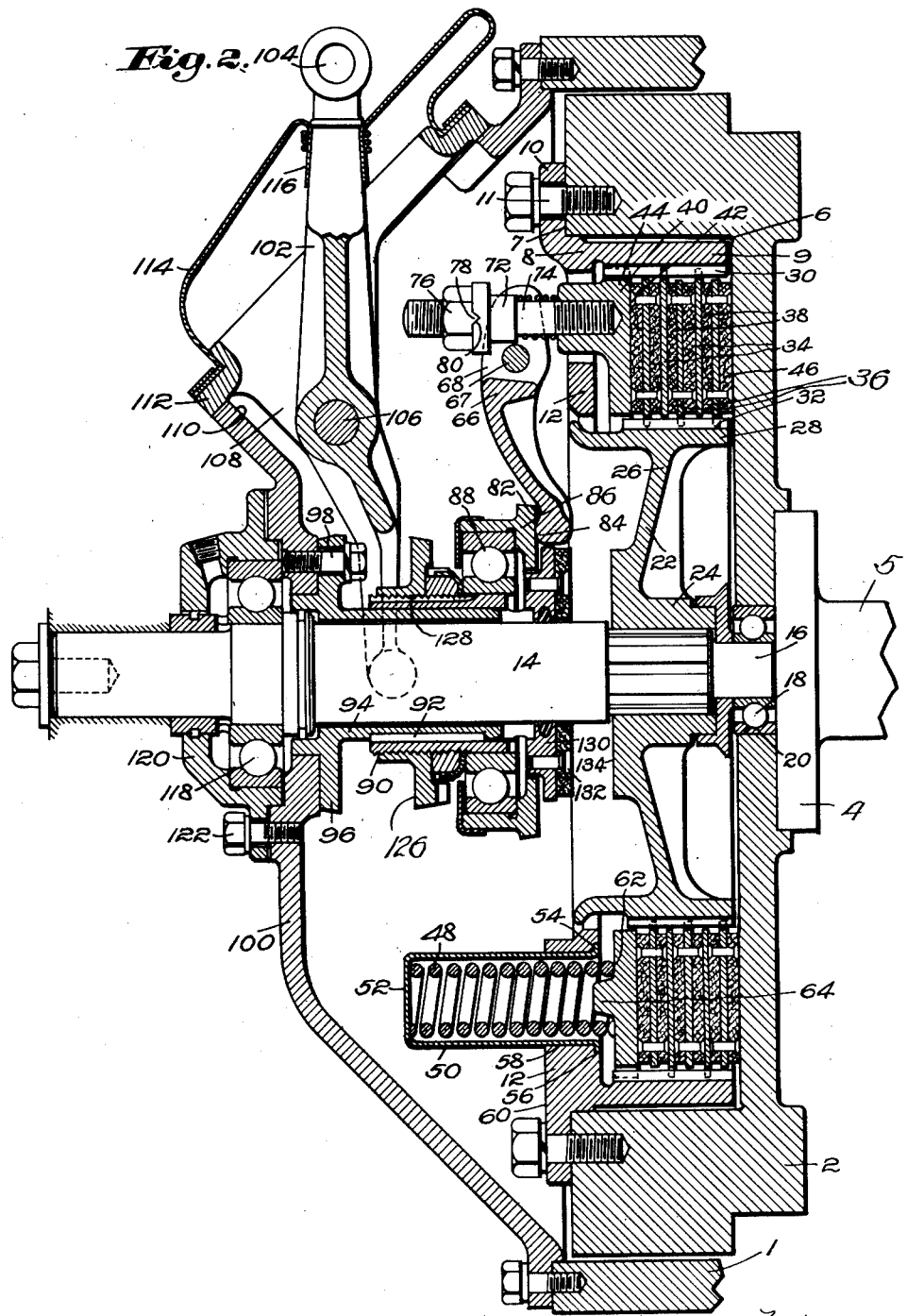
Inventor:
Frederick O. Snow, Jr.
by Emery, Booth, Janney & Varney, Attys.

Patented Sept. 27, 1932

1,879,569

UNITED STATES PATENT OFFICE

FREDERICK O. SNOW, JR., OF WINCHESTER, MASSACHUSETTS, ASSIGNOR TO MEAD-MORRISON MANUFACTURING COMPANY, OF EAST BOSTON, MASSACHUSETTS, A CORPORATION OF MAINE

CLUTCH

Application filed August 16, 1928. Serial No. 300,112.

This invention aims to provide an improved friction clutch for power transmitting mechanism.

In the accompanying drawings, I have shown merely for illustrative purposes one embodiment of my invention, wherein Fig. 1 is a rear elevation of the clutch mechanism with parts thereof broken away to more clearly illustrate the invention, and to save space in the drawings;

Fig. 2 is a section taken substantially on the line 2—2 of Fig. 1, and

Figure 1:
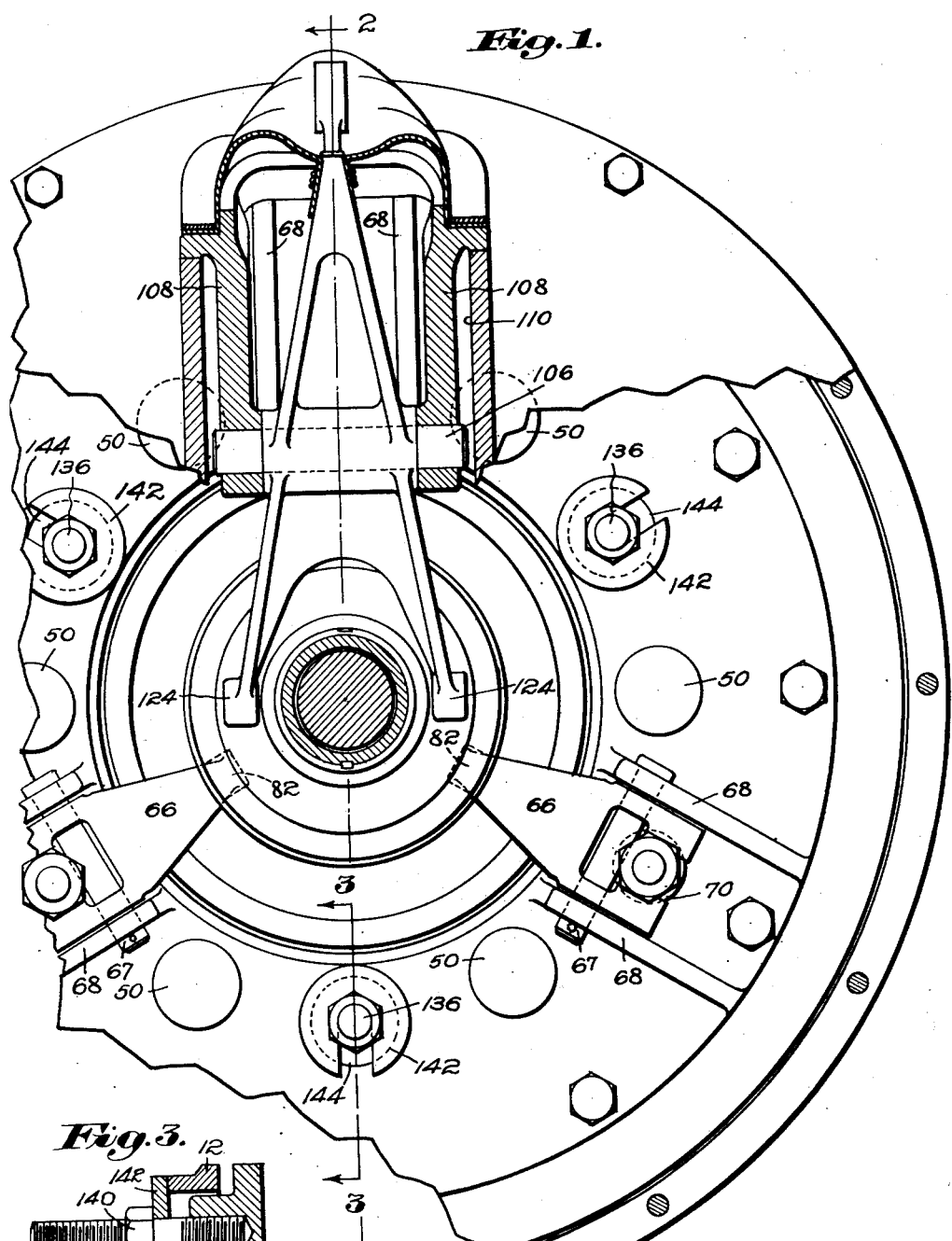
Figure 3:
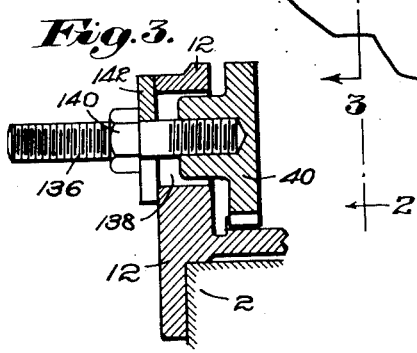
Fig. 3 is a detail section on the line 3—3 of Fig. 1.

The particular embodiment of this invention selected for purposes of illustration, and shown in the drawings, is in the form of a master clutch mechanism, particularly adapted for use on motor vehicles, and comprises a circular housing 1 enclosing a fly wheel 2 of the power unit. The fly wheel 2 is secured in any appropriate manner to a flange 4 forming a part of the drive shaft 5 of said power unit, so as to cause said fly wheel to revolve with said shaft. The fly wheel 2 has a central recess 6 in its inner face 7, and secured within said recess is a driving clutch member 8, provided with a cylindrical portion 9 arranged concentric with the rim of said fly wheel and an annular flange 10 which extends outwardly from one end of said cylindrical portion 9, and is secured herein by screws 11 to the inner face of said fly wheel causing said driving clutch member to turn with the fly wheel. Also extending inwardly radially from near one end of said cylindrical portion 9, preferably from that end from which the flange 10 extends, is a second flange 12. A driven shaft 14 is arranged with its axis coincident with the axis of the fly wheel 2, and this shaft is provided with a reduced end 16 journalled in a bearing unit 18 arranged within a central axial recess 20 in said fly wheel, thus maintaining the shaft 14 in constant alignment with the axis of the said fly wheel and its driving shaft 5. Splined upon said shaft 14 to rotate therewith is a driven clutch member 22 having a hub 24 keyed to the shaft 14 and an outwardly extending web 26 carrying a cylindrical rim 28 concentric with the portion 9 of said driving member.

The driving member of said clutch is provided with a circumferential series of keys 30 arranged parallel with the axis of said driving member and upon the inner face of the cylindrical portion 9 thereof. The cylindrical portion 28 of the driven clutch member has upon its outer surface opposed to the keys 30 a circumferentially spaced series of ribs 32.

Interposed between the driving and driven clutch members are driving and driven clutch rings 34 and 36 respectively, which alternate with each other and respectively engage the keys 30 and 32 of their respective clutch members. The rings 36 of the driven clutch member desirably have friction elements 38 secured to opposite faces thereof which engage adjacent driving clutch rings 34, and when sufficient pressure is brought to bear upon said rings motion is transmitted from the driving rings to said driven rings effecting rotation of the driven clutch member.

A pressure ring 40 is preferably interposed between the end ring of the series of clutch rings composed of the rings 34 and 36 and the flange 12 and this ring is provided with a bearing face 42 engaging the adjacent friction element 38 of the driven clutch ring 36. Furthermore, said pressure ring has a series of keyways 44 in its periphery to engage the keys 30 and insure the turning of said pressure ring 40 with the driving clutch element. The face of the fly wheel at the back of the recess 6 is finished at 46, and constitutes a pressure surface for engaging the clutch ring at the opposite end of the series from the pressure ring face 42.

Means are provided for exerting a yielding pressure upon the pressure ring 40 to compress the series of clutch rings against the surface 46 of said driving member or fly wheel, this pressure being sufficient to transmit motion from the driving member to the driven member. These pressure means desirably include a series of springs 48 spaced circumferentially about the flange 12 and contained in cup shaped members 50. The cup shaped members are closed at one end as at 52, and have annular external flanges

54 at their opposite ends which seat in recesses 56 in the inner face of the flange 12, the bodies of said cup shaped members 50 extending through holes 58 in said flange and projecting laterally from the face 60 of said flange. The springs 48 seat at one end against the closed ends 52 of the cups 50, while the opposite ends thereof engage and seat against the rear face 62 of the pressure ring 40 encircling projections 64 formed on said pressure plate to prevent displacement of said springs.

To throw out the clutch and prevent the transmission of power from the driving clutch member 8 to the driven clutch member 22, I herein provide a series of clutch levers 66 desirably three in number which are uniformly spaced circumferentially of the face of the flange 12, and pivoted on pins 67 between laterally projecting ears 68 on the driving member 8.

The clutch levers 66 are arranged radially with respect to the axis of the shaft 14 and their outer ends are forked at 70 to straddle and engage opposite faces of collars 72 mounted upon studs 74 carried by the pressure ring 40. A nut 76 has screw-threaded engagement with the outer end of the stud 74, and is provided with teeth 78 adapted to engage corresponding notches 80 in the adjacent face of said collar 72 to prevent accidental or inadvertent rotation of the nut relatively to said collar. The portion of the collar 72 between the arms of said lever 66 may be formed in any known irregular manner to engage the inner faces of said arms and prevent rotation of said collar, and likewise the nut 76 at least when the teeth 78 are in engagement with the notches 80.

The inner ends of the levers 66 are rounded at 82 and these rounded ends engage the face 84 of a common clutch lever actuator 86, said actuator being journalled upon a bearing unit 88 carried upon a non-rotatable sleeve 90 splined at 92 to a stationary sleeve 94 surrounding the shaft 14. The sleeve 94 has a flange 96 on its outer end secured by screws 98 to the cover 100 of the clutch housing 1.

By reason of the foregoing construction, the actuator 86 will be permitted to rotate freely upon the sleeve 90, but is moved axially of the shaft 14 by clutch throw-out means operable from the exterior of the clutch housing.

In the present example, the clutch throw-out means includes a lever 102 having at its outer end an eye 104 connected with any suitable operating means not shown in the drawings. The lever 102 is pivoted upon a pin 106 carried by arms 108 extending into the housing 1 through an opening 110 provided in the cover plate 100, through which opening access may be had to the interior of the clutch. The arms 108 are herein formed on a second plate 112 which is secured over the opening 110, and secured in surrounding relation to said cover 112 is a flexible member or boot 114 which latter is secured at its outer end 116 to the movable end of the lever 102, thus preventing dust and dirt from entering the clutch housing, and also preventing grease from being discharged out from said clutch housing. The rear end of the shaft 14 is journalled to rotate in a bearing unit 118 carried by an oil retaining cap 120 secured by screws 122 to the cover 100. The lower end of the lever 102 is forked as shown most clearly in Fig. 1, having arms 124 arranged to straddle the shaft 14 and engage opposite sides of a flange 126, secured by screw threads 128 to the sleeve 90, said flange 126 being adjustable axially of said sleeve to vary the relation of the lever 102 to the clutch shifting ring 86.

The end of the non-rotatable sliding sleeve 90 nearest to the driven clutch member has a flange 130, the outer face of which flange is provided with a friction member 132, which is arranged to engage a finished face 134 of the driven clutch member 22, when the ring 86 is moved to its extreme clutch throw-out position. Said friction member 132 and said face 134 which are normally out of contact come together and constitute a brake for stopping further rotation of said driven clutch member after the latter has been disconnected from the driving clutch member.

The lever 102, clutch-shifting ring 86 and its associated parts, and the levers 66, constitute means for throwing out the clutch by relieving the pressure of the springs upon the pressure ring 40.

There are times, however, when it is desirable to compress the springs 48 and retain them compressed for a considerable period, as for example, when the clutch is being assembled or disassembled, or when it is desired to remove and repair or resurface one or more clutch rings. To this end, I provide a series of studs 136 spaced uniformly around the circumference of the pressure ring 40 and in screw-threaded or other engagement with said pressure ring. These studs, of which three are shown in Fig. 1, extend from the pressure ring outwardly through openings 138 in the flange 12. A nut 140 is arranged upon each of said studs, and is adjustable into engagement with a washer 142 encircling said stud and spanning or entirely covering the open end of the hole 138 whereby when said nut is screwed down on said stud against said washer, the pressure ring 40 will be drawn outwardly from contact with the series of clutch rings, compressing the springs 48 and relieving the pressure upon said clutch rings. These screws hold said pressure ring in the withdrawn position, so that the said clutch rings and the parts associated therewith may easily be removed and replaced when desired.

The washer 142 may be slotted as at 144 so that if desired it may be withdrawn when not in use.

The invention is not limited to the particular embodiment herein shown.

I claim:

1. A friction clutch comprising, in combination, an engine fly wheel, a driving clutch member having a flange engaging the rear face of said fly wheel, said member having a cylindrical portion extending into said fly wheel, said member having an inwardly directed flange at its outer end, means by which said first flange is secured to said fly wheel, a pressure ring arranged adjacent to the inner face of said cylindrical portion and keyed to turn therewith, but adjustable axially of said driving member, a driven shaft, a driven clutch member arranged within said driving clutch member, a series of clutch rings interposed between said pressure ring and said fly wheel and alternately keyed to the driving and driven clutch members, a series of springs interposed between said pressure ring and said second flange to apply pressure to said clutch rings, and clutch levers carried by said second flange to release said clutch rings.

2. A clutch comprising, in combination, a driving element, a driven element having a friction surface, a series of friction rings disposed between said elements, springs to maintain friction between said rings and transmit motion from one ring to the other, a series of clutch levers for compressing said springs to relieve pressure upon said rings, a common operating collar for said clutch levers, a stationary sleeve upon which said collar is mounted to move toward the driven clutch element to operate said clutch levers and a friction ring splined upon said sleeve and movable with said collar into engagement with said friction surface to stop rotation of said driven clutch element.

3. A clutch comprising, in combination, a driving element, a driven element having a friction surface, a series of friction rings disposed between said elements, springs to maintain friction between said rings and transmit motion from one ring to the other, a series of clutch levers for compressing said springs to relieve pressure upon said rings, a common operating collar for said clutch levers, a stationary sleeve upon which said collar is mounted to move toward the driven clutch element to operate said clutch levers and a friction ring splined upon said sleeve and movable in unison with said collar into engagement with said friction surface to stop rotation of said driven clutch element, following the release of said clutch rings.

4. In a clutch, in combination, a fly wheel having a recess in its rear face, a driving clutch element secured to said fly wheel having a cylindrical portion extending into said recess, a driven clutch element arranged within said recess concentric with said cylindrical portion, a series of clutch rings disposed between said driving and driven elements and alternately keyed to said driving and driven clutch elements, springs to maintain pressure upon said clutch rings to transmit motion from one of said clutch elements to the other, clutch levers for compressing said springs, a housing enclosing said fly wheel, a cover plate detachably secured to said housing and an operating lever for said clutch, said operating lever being pivotally carried by said cover plate and removable therewith for operating said clutch levers through said cover plate and a flexible closure between said cover plate and the operative end of said clutch lever.

5. In a clutch, in combination, a fly wheel having a recess in its rear face, a driving clutch element secured to said clutch having a cylindrical portion extending into said recess, a driven clutch element arranged within said recess concentric with said cylindrical portion, a series of clutch rings disposed between said driving and driven elements and alternately keyed to said driving and driven clutch elements, springs to maintain pressure upon said clutch rings to transmit motion from one of said clutch elements to the other, clutch levers for compressing said springs, a housing surrounding said fly wheel, a cover plate detachably secured to said housing and enclosing said clutch, a sleeve carried by said cover plate, a collar supported by said sleeve and slidable thereon to operate said clutch levers to relieve pressure upon said clutch rings, and a friction member splined to said sleeve and movable with said collar to engage a face of said driven clutch element and stop the rotation thereof.

6. In a friction clutch, in combination, driving and driven clutch members, clutch rings interposed between said members, spring means to exert pressure upon said rings to transmit power from said driving to said driven members, a housing for said members, an opening through which access may be had to said clutch members, a cover for said opening, means to release said spring pressure from said rings including a shiftable member, a forked clutch lever carried by said cover and projecting into said housing through said opening into operative engagement with said shiftable member to effect shifting thereof, and the throwing out of said clutch.

7. In a friction clutch, in combination, driving and driven clutch members, clutch rings interposed between said members, spring means to exert pressure upon said rings to transmit power from said driving to said driven members, a housing for said members, an opening through which access may be had to said clutch members, means to release said spring pressure from said rings including a shiftable member, a cover for said opening, a clutch lever pivotally supported upon said cover at a distance within said casing and in operative engagement with said shiftable member for operating the latter to throw out the clutch.

8. In a friction clutch, in combination, driving and driven clutch members, clutch rings interposed between said members, spring means to exert pressure upon said rings to transmit power from said driving to said driven members, a housing for said members, an opening through which access may be had to said clutch members, means to release said spring pressure from said rings including a shiftable member, a cover for said opening, also provided with an opening, a clutch lever projecting through the opening in said cover and pivotally mounted in operative engagement with said shiftable member, and flexible means surrounding said cover opening and said lever to exclude dust from said housing.

9. A clutch comprising, in combination, a driving element, a driven element having a friction surface, spring means normally to maintain driving connection between said driving element and said driven element to transmit motion from one to the other, a plurality of clutch levers for compressing said spring means to interrupt said driving connection, a common operating collar for said clutch levers, a stationary sleeve on which said collar is mounted to move toward said driven element to operate said clutch levers, and a friction ring splined on said sleeve and movable with said collar into engagement with said friction surface to stop the rotation of said driven element.

In testimony whereof, I have signed my name to this specification.

FREDERICK O. SNOW, Jr.